US007169458B2

(12) United States Patent
Underhill et al.

(10) Patent No.: US 7,169,458 B2
(45) Date of Patent: Jan. 30, 2007

(54) CLOTH-LIKE TISSUE SHEETS HAVING CAMOUFLAGED TEXTURE

(75) Inventors: Richard Louis Underhill, Neenah, WI (US); Paul Douglas Beuther, Neenah, WI (US); Robert Irving Gusky, Appleton, WI (US); Kevin Joseph Vogt, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/434,703

(22) Filed: May 15, 2006

(65) Prior Publication Data

US 2006/0204726 A1 Sep. 14, 2006

Related U.S. Application Data

(62) Division of application No. 10/397,748, filed on Mar. 25, 2003, now abandoned.

(51) Int. Cl.
*B32B 3/00* (2006.01)
*D06N 7/04* (2006.01)
*D21H 11/00* (2006.01)
*B31F 1/07* (2006.01)

(52) U.S. Cl. ...................... 428/156; 428/153; 428/409; 162/109; 162/111

(58) Field of Classification Search ................ 428/153, 428/156, 171, 220, 409; 162/109, 111
See application file for complete search history.

(56) References Cited

U.S. PATENT DOCUMENTS 5,779,965 A * 7/1998 Beuther et al. ............. 264/280

* cited by examiner

*Primary Examiner*—Donald J. Loney
(74) *Attorney, Agent, or Firm*—Gregory E. Croft

(57) ABSTRACT

Embossing regularly textured sheets with an appropriate regular, discrete embossing pattern to improve softness can result in a combined texture that creates an interference pattern that camouflages the original texture pattern and the embossing pattern. The resulting pattern is more appealing to the eye and is more random in appearance than the initial textured sheet or the embossing pattern individually. This result is particularly advantageous for paper towels.

9 Claims, 10 Drawing Sheets

CLOTH-LIKE TISSUE SHEETS HAVING CAMOUFLAGED TEXTURE

This application is a divisional application of and claims priority to application Ser. No. 10/397,748 filed Mar. 25, 2003 now abandoned. The entirety of application Ser. No. 10/397,748 is hereby incorporated by reference.

BACKGROUND OF THE INVENTION

Two key attributes of a premium paper towel are softness and a pleasing cloth-like visual texture. Softness can be enhanced by embossing the towel basesheet with a regular pattern of relatively small, discrete embossing elements, such as a pattern of dots. However, while the softness improvement is desirable, consumers tend to associate products having such regular embossing patterns with products of lower quality. It would be desirable to be able to soften a paper towel, for example, with an embossing pattern that is less objectionable to the consumer and promotes a cloth-like appearance.

SUMMARY OF THE INVENTION

It has now been discovered that the negative visual impact associated with embossing patterns having a regular pattern of discrete elements can be minimized by designing the embossing pattern to optically interact with a pre-existing regular, distinct texture pattern in the sheet to create an "interference pattern" that optically camouflages both the pre-existing texture pattern and the embossing pattern. The pre-existing texture pattern can be an embossing pattern or it can be a fabric imprinting pattern. This discovery has been found to be particularly advantageous for embossing airlaid or throughdried tissue sheets that have a regular, distinct surface texture imparted by one or more of the fabrics used to support the sheet during manufacture.

Hence, in one aspect the invention resides in a method of embossing a textured tissue sheet having a regular, distinct, overall texture pattern, said method comprising embossing the textured sheet to provide a regular, distinct, overall embossing pattern that is different than the texture pattern and results in an optical interference pattern.

In another aspect, the invention resides in a tissue sheet having at least two distinct, regular, overall texture patterns and an optical interference pattern.

In another aspect, the invention resides in a tissue sheet having a surface texture characterized by 24 or fewer, more specifically 12 or fewer, still more specifically 6 or fewer, primary polar spatial frequencies greater than 0.2 $mm^{-1}$ where the primary polar spatial frequencies have Fourier magnitudes greater than 5 times the average Fourier magnitude for the tissue surface and are limited in number to those with Fourier magnitudes of 20 percent or more of the special frequency with the largest Fourier magnitude, such that no two of the primary Fourier magnitudes have absolute frequency differences less than 0.1 $mm^{-1}$.

As used herein, the term "tissue sheet" is meant to include soft and/or bulky paper sheets useful as facial tissue, bath tissue, paper towels or table napkins.

As used herein, an "optical interference pattern" is a pattern that is at least faintly discernable to the naked eye and results from the combination of two or more distinct, regular, overall texture patterns that are at least slightly different in their pattern or in their angular orientation. The optical interference pattern is the result of adjacent regions on the surface of the sheet having differing densities of visible pattern elements. For example, when two pattern elements completely overlap each other, they appear as one element (low density). When the same two elements fall side-by-side, they appear as two closely-spaced elements (high density). These regions of differing texture element densities gives rise to a new visible pattern that camouflages the appearance of the two individual patterns that created it.

As used herein, the term "distinct" means that the pattern consists essentially of spaced-apart individual elements, such as dots, ovals, diamonds, squares and the like. The shape of the individual elements can be regular or irregular. The term "distinct" is intended to distinguish from patterns consisting of intersecting, relatively long curvilinear lines.

As used herein, the term "regular" means that the pattern of elements is repeating and is not random in at least one direction.

As used herein, the term "overall" means that the pattern of elements substantially covers the sheet. Such patterns are sometimes referred to as "background" patterns and are distinguished from decorative patterns consisting of relatively large spaced-apart icons such as flowers, butterflies, etc. Overall patterns will have from 4 to about 50 elements per square centimeter, more specifically from about 10 to about 30 elements per square centimeter, and still more specifically from about 15 to about 20 elements per square centimeter. Also, in order to be most effective for purposes of softening the sheet, overall embossing patterns will have a surface area coverage of from about 20 to about 60 percent, more specifically from about 30 to 50 percent, and still more specifically from about 35 to about 45 percent.

As used herein, the term "texture pattern" means a pattern of elements having some three-dimensionality or a z-directional component that is noticeable to a user of the product. Texture can be imparted to the sheet by embossing or during formation of the sheet by contact with various fabrics. The depth or z-directional component of the elements of the interfering texture patterns need to be the same or at least somewhat similar in magnitude, otherwise the optical interference pattern will not be noticeable to a user of the product. Numerically, any difference in depth between the elements of the interfering patterns should be about 80 percent or less, more specifically about 60 percent or less, still more specifically about 40 percent or less, still more specifically about 20 percent or less, and still more specifically about 10 percent or less.

The optical interference patterns can be formed by the combination of two or more embossing element patterns or one or more embossing element patterns in combination with a texture pattern imparted to the tissue sheet when the sheet is made. In the latter case, it is common for tissue sheets, such as airlaid or throughdried sheets, to have a noticeable overall regular texture pattern of elements that is imparted to the sheet as a result of contact with a fabric during manufacture. The fabric can be a forming fabric, a transfer fabric, a throughdrying fabric or other fabric. These fabrics, if woven, have a regular knuckle pattern that imprints the sheet with texture elements that correspond to the knuckle pattern. In such cases, the subsequent embossing pattern can be designed to interact with the existing textured sheet pattern. Methods of imparting initial texture element patterns to the sheet while the sheet is being made are well known to those skilled in the tissue making art. Examples include, without limitation, methods disclosed in U.S. Pat. No. 6,017,417 entitled "Method of Making Soft Tissue Products" issued Jan. 25, 2000 to Wendt et al. and U.S. Pat. No. 5,935,381 entitled "Differential Density Cellulose Structure and Process For Making Same" issued Aug. 10,1999 to Trokhan et al., both of which are herein incorporated by reference.

In order to generate an optical interference pattern, the two or more embossing or texture element patterns must be different in some way with regard to their application to the tissue sheet. This difference can be in terms of the element spacing, the spacing of rows of elements, the angle of the rows of elements with respect to the machine direction of the tissue sheet, or the skewing of the pattern relative to the cross-machine direction of the sheet. Any one or more of these pattern differences can give rise to an optical interference pattern.

In the simplest form, optical interference patterns can appear as a series of parallel stripes. In such cases, the thickness of the stripes can be from about 0.5 to about 3 centimeters, more specifically from about 1 to about 2.5 centimeters, and still more specifically from about 1 to about 2 centimeters. If the optical interference pattern is the result of the interaction of more than two distinct, regular overall patterns, the optical interference pattern can manifest itself in the form of a regular pattern of odd shapes. It is possible to visually measure the size and spacing of these patterns. However, because of random effects also present on the tissue surface, a more precise method of quantifying the presence of the interference patterns is by measuring the surface topography of a large area of the tissue surface and transforming that spatial distribution of the surface into a frequency domain. This can be done in several different ways, but a method that uses a mathematical transformation of the measured surface topography, specifically a Fourier transform, is particularly useful.

To carry out this method, a measurement of the tissue surface is made on a 25 millimeter square section of tissue, although a larger size is also acceptable. The measurement records the height of the tissue at a regular orthogonal array of points that are equidistance from each other, preferably less than 0.1 millimeter apart. The data is recorded as a two dimensional array consisting of the height of the tissue, z, measured in millimeters at each of the spatial (x,y) coordinates.

In order to provide the benefit of camouflage in the eyes of the product user, there must be multiple optical interference patterns present on a particular tissue sheet product. The minimum number of optical interference patterns present will depend upon the size of the tissue sheet, the size and shape of the optical interference pattern and the frequency of the optical interference pattern. For example, bath tissue sheets are typically only about 10 centimeters square. On the other hand, paper towel sheets are about 30 centimeters square. To be effective, the number of optical interference patterns present in a single sheet of bath tissue will be less than the number present in a single sheet of paper toweling. In general, if the optical interference pattern is a series of stripes, the number of stripes can be from about 0.2 to about 1 per lineal centimeter, more specifically from about 0.3 to about 0.9 per lineal centimeter, more specifically from about 0.4 to about 0.8 per lineal centimeter, and still more specifically from about 0.5 to about 0.7 per lineal centimeter, taken in a direction perpendicular to the direction of the stripes. Stated differently in a manner applicable to optical interference patterns of any shape, the percent area of the tissue sheet occupied by an optical interference pattern can be about 30 percent or greater, more specifically about 40 percent or greater, still more specifically from about 30 to about 70 percent, still more specifically from about 40 to about 60 percent, and still more specifically from about 45 to about 55 percent.

As mentioned above, measurement of the area of an optical interference pattern can be made by visually approximating the boundaries of the optical interference pattern and simply calculating the percent area coverage. Alternatively, identification and measurement of the optical interference pattern can also be determined by the use of surface mapping and Fourier transform analysis. The analysis method is outlined below:

1. Measurement of surface topography over a 256×256 array covering at least 25×25 millimeters of tissue surface;
2. Electronic conversion of X,Y,Z data scaled in millimeters to a computer algorithm;
3. Subtract the average value of the Z data from each Z element;
4. Nyquist shift the Z data array;
5. 2-D Fourier transform of the Z-data, converted to Fourier magnitudes;
6. Analyze the Fourier magnitudes and associated spatial frequencies to find spatial frequency combinations that can lead to the formation of optical interference patterns.

The surface topography can be measured with a stylus profilometer such as can be obtained using a Form Talysurf Laser Interferometric Stylus Profilometer (Taylor Hobson Ltd., 2, New Star Road, Leicester, England LE4 9JQ). The stylus used is Part #112/1836, diamond tip of nominal 2-micrometer radius. The stylus tip is drawn across the sample surface at a speed of 0.5 millimeters/sec. The vertical (Z) range is 6-millimeters, with vertical resolution of 10.0 nanometers over this range. Prior to data collection, the stylus is calibrated against a highly polished tungsten carbide steel ball standard of known radius (22.0008 mm) and finish (Part # 112/1844 [Taylor Hobson Ltd.]. During measurement, the vertical position of the tip is detected by a helium/neon laser interferometer pick-up, Part # 112/2033. Data is collected and processed using Form Talysurf Ultra Series 2 software or equivalent.

To measure the topography parameters for a particular tissue sample, a portion of the tissue is removed with a single-edge razor or scissors (to avoid stretching the tissue) from a position near the center of the sheet (to avoid edge curl or other damage). The tissue is attached to the surface of a 2"×3" glass slide using double-side tape and lightly pressed into uniform contact with the tape using another slide. The slide is placed on the electrically operated, programmable Y-axis stage of the profilometer. For purposes of measuring the surface, the profilometer is programmed to collect a "3D" topographic map, produced by automatically data logging 256 sequential profile traces in the stylus traverse direction (X-axis), each 25 millimeters in length. The Y-axis stage is programmed to move in 98 micrometer increments after each traverse is completed and before the next traverse occurs, providing a total Y-axis measurement dimension of 25 millimeters and a total mapped area measuring 25×25 millimeters. With this arrangement, data points each spaced 98 micrometers apart in both axes are collected, giving the maximum total 65,536 data points per map available with this system. The resultant "3D" topological map, being configured as a ".SUR" computer file consisting of X-, Y- and Z-axis spatial data (elevation map), is then transformed into the frequency domain mathematically with a Fourier transform algorithm as described below. Other methods that provide a similar representation of the tissue surface, such as CADEYES (discussed in U.S. Pat. No. 5,779,965, which is herein incorporated by reference) may also be used.

The analysis of surface texture using Fourier analysis is discussed, for example, in the text *The Image Processing Handbook*, Third Edition, J. C. Russ, ISBN 0-8493-2532-3, and *Development of Methods for the Characterization of Roughness in Three Dimensions*, K. J. Stout, ed., ISBN 1 8571 8023 2, and Digital Image Processing, R. C. Gonzalez and P. Wintz, ISBN 0-201-11026-1, all of which are hereby incorporated by reference. Numerous software programs can be used to calculate the Fourier transform and other data manipulations. National Instruments offers one such software package (LabVIEW™) that is easy to use (National Instruments Corporation, 6504 Bridge Point Parkway, Austin, Tex. 78730-5039 (512) 794-0100.) The programming is graphical, and is shown listed in FIG. 10. This example program assumes the input height data from the surface topography measurement is stored in a 256×256 array in a spreadsheet, and that the heights have all been normalized by subtracting the mean of the data set from each element. Other normalizations can also be made if necessary, such as removing an overall tilt from one side of the tissue to the other due to improper leveling during measurement. Once the height data is stored, it is analyzed as shown in FIG. 10.

Referring to FIG. 10, the first module reads the data in from a spreadsheet file, which the user must set-up from the surface topography scan. Only the height data is read, as the x and y data are assumed to be in numerical order of unscaled numbers 0–255. The second module Nyquist shifts the data so that the resulting Fourier transform is centered on zero frequency. Mathematically this is represented by $z(x, y)*\exp(j2\pi(u_0x+v_0y)/N)$ for all pairs of x and y. $u_0$ and $v_0$ have values of N/2, or 128 as defined here. The third module is the 2D Fourier transform which follows the form:

$$F(u, v) = \frac{1}{N}\sum_{x=0}^{N-1}\sum_{y=0}^{N-1} z(x, y)\exp(j2\pi(ux + vy)/N)$$

where z(x,y) is the height data in the two orthogonal directions, x and y. N is the number of measurements in each direction, 256. F(u,v) is the Fourier transform of the height data. The independent variables u and v are no longer distances, but spatial frequencies in the x and y directions, respectively. Because F is a complex number, the third module is a conversion from real and imaginary components to a polar coordinate representation, such that for F(u,v)=Fr (u,v)+j*Fj(u,v) where j is the square root of −1, Fr and Fj are the real and imaginary components of F, and we calculate the Fourier magnitude, Fm, as the square root of (Fr*Fr+Fi*Fi) for each element of the 2-dimensional array, F. The final module writes the array to a spreadsheet file, although it could also be plotted, listed, or transferred to any other media.

Once the Fourier transform data is in a spreadsheet, it is helpful to transform the 2-dimensional array into a 1-dimensional array and list the u and v coordinates next to the values of Fm. The u and v values are obtained by dividing the corresponding i and j indices that range from 0 to 255 by the size of the tissue sample, which in this example is 25 millimeters. The spreadsheet will then contain three columns of numbers, each column with 65536 numbers in it (256*256). One column will be the frequency in the x-direction (u values, the x indices 0–255 divided by the sample size of 25 mm), one column will be the frequency in the y-direction (v values, the y indices 0–255 divided by the sample size of 25 mm) and the third column will be the Fourier magnitude, Fm, of the 2-D Fourier transform of the surface topography.

The average Fourier magnitude of the surface is defined by calculating the average value of all 65536 values of Fm. The u and v values that are associated with the 24 largest values of the 65536 Fourier magnitudes are defined as the primary spatial frequencies. These are determined by sorting the entire data set in descending order. Once the average Fourier magnitude has been calculated and the entire data set sorted, the lowest 65512 values of Fm and their associated values of u and v can be deleted. For each of the 24 remaining Fourier magnitudes and the associated spatial frequencies u and v, only tissues where the 24 primary spatial frequencies are greater than a predetermined minimum are considered. Because the two frequencies (u,v) for each primary Fourier magnitude can be different for the two directions, the spatial frequencies are combined into a fourth variable, the polar spatial frequency defined as the square-root of the sum of the squares of each u,v frequency pair. Preferably this minimum polar frequency is 0.2 $mm^{-1}$. For many patterns, there are not 24 frequencies with large Fourier magnitudes. In these cases, one should not use all of the largest 24 Fourier magnitudes, but define a smaller subset of primary Fourier magnitudes that contains the largest Fourier magnitude and all those Fourier magnitudes smaller than the maximum that are larger than a predetermined percentage of the maximum, but always limited to a maximum number of 24 total. Specifically, this predetermined percentage can be 20 percent or more, more specifically 30 percent or more, and still more specifically 40 percent or more.

The smallest Fourier magnitudes also need to be significantly higher than the average level of all the Fourier magnitudes as defined above. All of the primary Fourier magnitudes should have a value of 5 or more times the average Fourier magnitude, more specifically 10 or more times the average Fourier magnitude, and even more specifically 20 or more times the average Fourier magnitude.

For a regular pattern with primary polar frequencies of 0.2 $mm^{-1}$ or greater, the absolute difference between any two pairs of spatial frequencies that correspond to the primary Fourier magnitudes will be 0.2 $mm^{-1}$ or greater. For the tissue disclosed here, there will be pairs of frequencies that are closer together than 0.2 $mm^{-1}$, which will result in interference patterns to appear on the tissue sheet. The frequency difference is calculated by comparing all possible combinations of frequencies, the absolute frequency difference being defined as fd=square root $((u_i-u_j)^2+(v_i-v_j)^2)$ where subscripts i and j refer to any two different frequencies. For purposes of this invention, it is advantageous for this absolute frequency difference to be 0.1 $mm^{-1}$ or less, more specifically 0.075 $mm^{-1}$ or less, and still more specifically 0.05 $mm^{-1}$ or less, for at least one pair of the primary Fourier magnitudes.

DETAILED DESCRIPTION OF THE DRAWINGS

Figure 1:
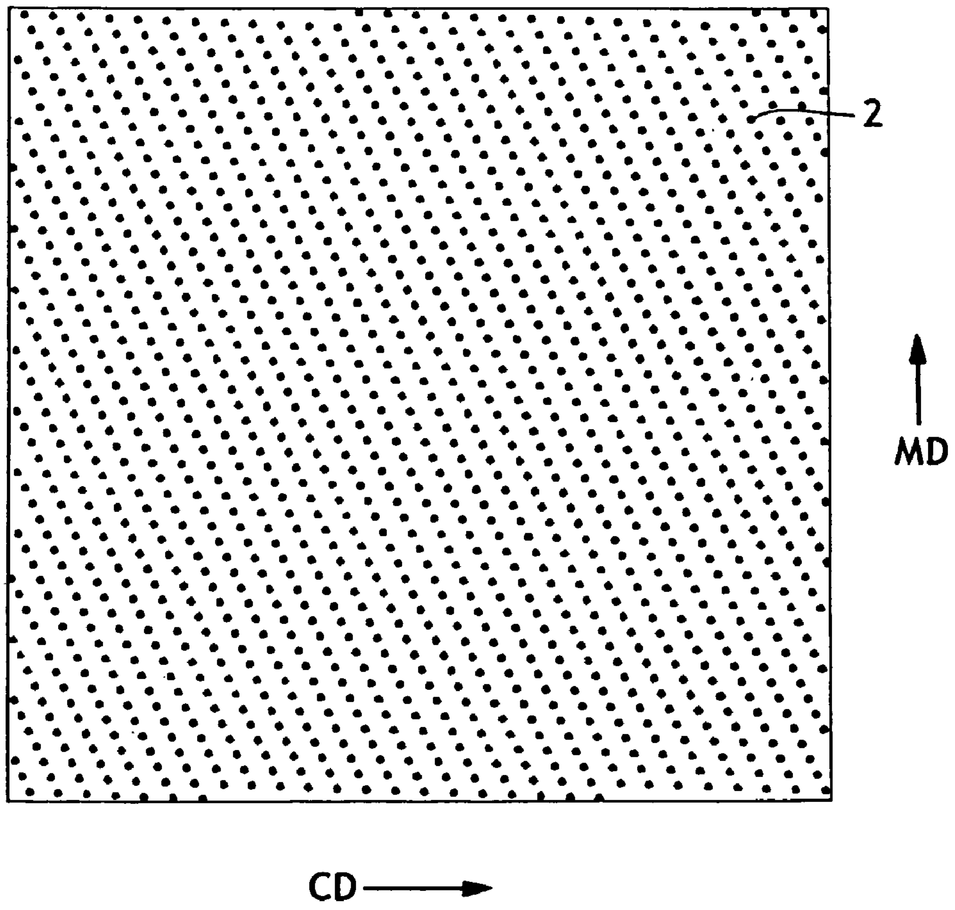
FIG. 1 is a digital image of a dot-like pattern which replicates a knuckle imprinting pattern imparted to an airlaid tissue web during manufacture as described in the Example below.

As used herein, the repeated use of any particular reference character in different Figures is intended to represent the same or analogous feature or element.

Referring now to FIG. 1, the invention will be described in further detail. Shown is a digital image of a regular, distinct overall pattern of dots 2 (which can represent protrusions or depressions in a tissue sheet) arranged in parallel rows running parallel to the cross-machine direction (CD) of the sheet. The dots in each alternating row are offset in the cross-machine direction by 25 percent of the spacing between the dots in the same row, resulting in an angular tilt to the pattern of about 25 degrees relative to the machine direction (MD) of the sheet. Also, as shown, the pattern as a whole is additionally slightly skewed about 1 degree relative to the cross-machine direction of the sheet. The extent to which the pattern is skewed is illustrated by viewing the last continuous full row of dots in the lowermost portion of FIG. 1.

Figure 2:
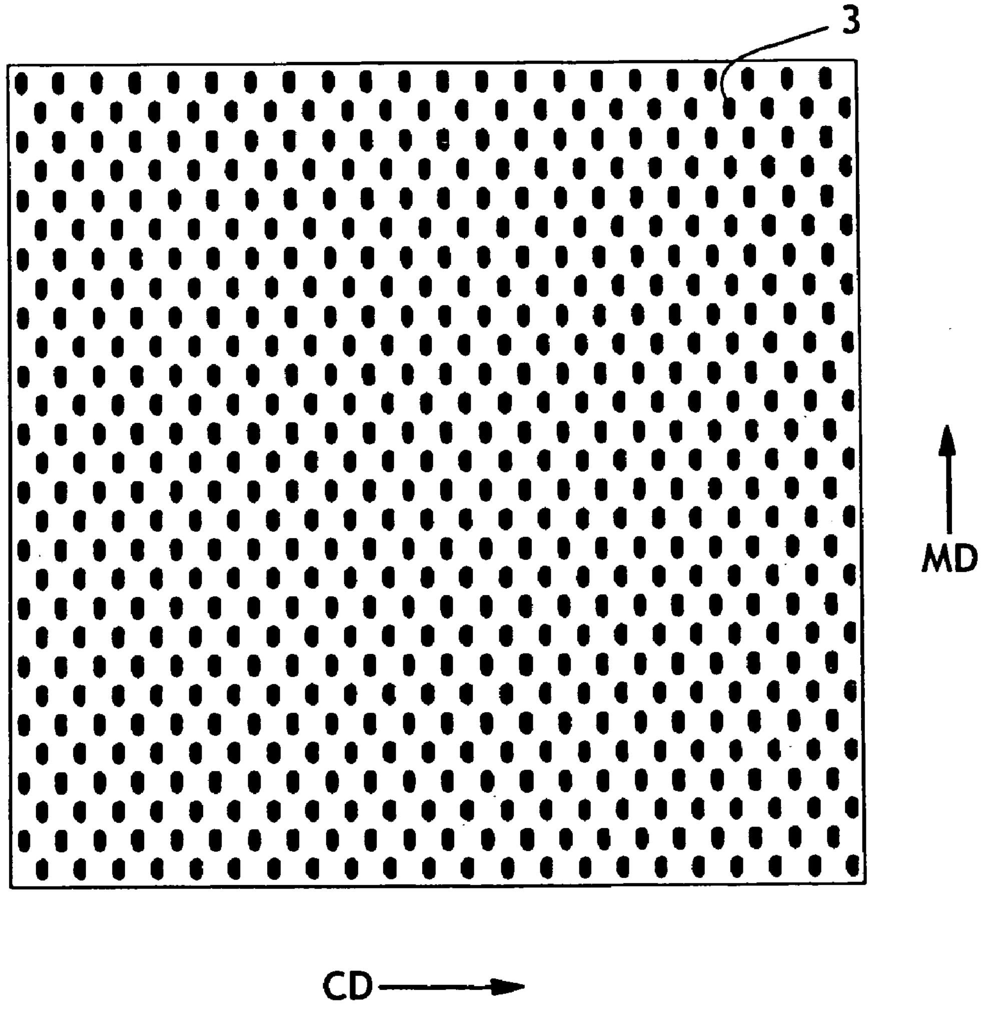
FIG. 2 is a digital image of a dot-like pattern which replicates an embossing pattern suitable for softening a tissue sheet.

FIG. 2 is a digital image of a regular, distinct overall pattern of dots 3 which is different than the pattern of FIG. 1. In this pattern, the dots are arranged in rows parallel to the cross-machine direction of the sheet (the pattern is square to the cross-machine direction and is not skewed). The dots in adjacent rows are offset in the cross-machine direction a distance of 50 percent of the spacing between dots in the same row, providing a staggered effect from row to row.

Figure 3:
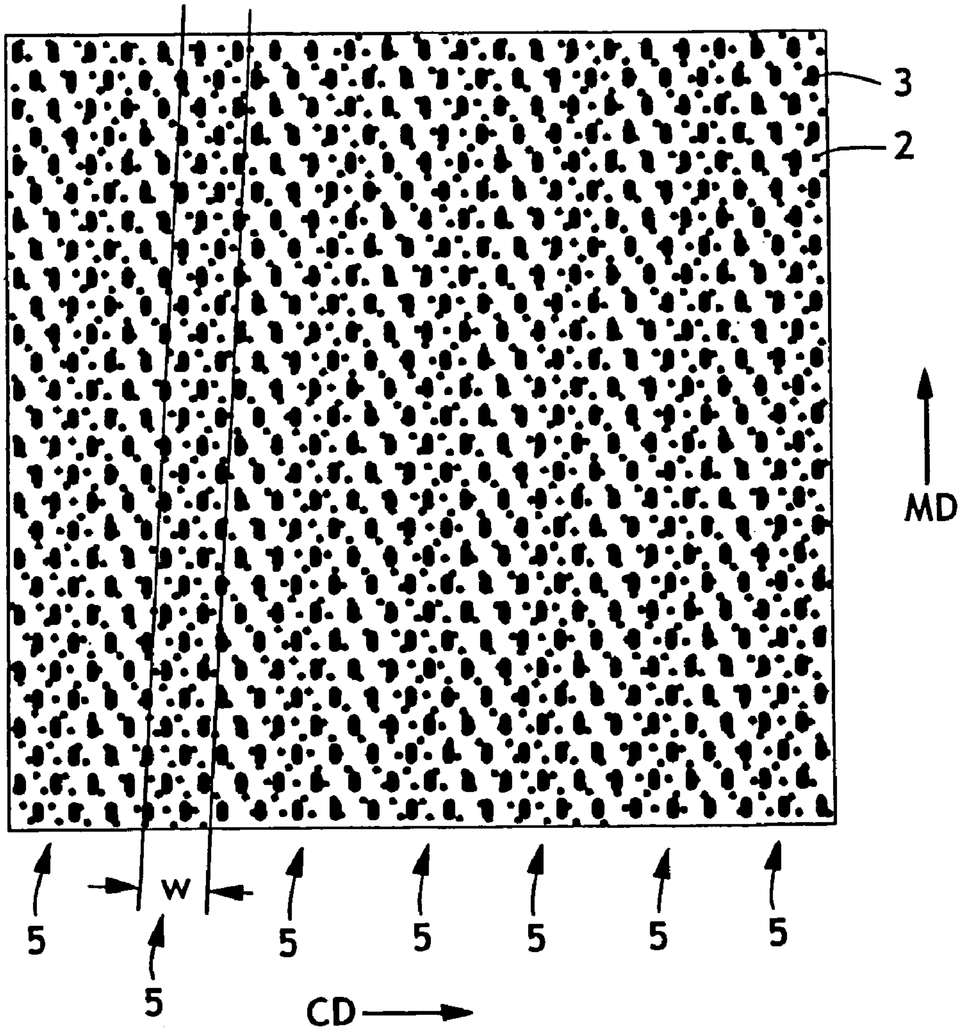
FIG. 3 is a digital image of the combined pattern resulting from overlaying the dot-like pattern of FIG. 2 on top of the dot-like pattern of FIG. 1, illustrating the camouflaging of the individual patterns and the appearance of interference stripe patterns.

FIG. 3 is a digital image of a pattern which results from overlaying the pattern of FIG. 2 on top of the pattern of FIG. 1 or vice versa. Because the two individual patterns are different, a series of optical interference stripe patterns 5 is created. In this Figure, there are six full-width optical interference stripe patterns illustrated. All of the stripes are parallel to each other and are angled slightly relative to the machine direction of the sheet. The width "W" of each optical interference stripe pattern is about 1.2 centimeters and represents a region where the degree of overlap between elements 2 and 3 is minimized, thereby appearing darker than the surrounding area where the some of the elements 2 and 3 overlap and appear as one. In this example, the spacing of the optical interference stripe patterns is about 2 centimeters, center-to-center. The area coverage of the optical interference stripe patterns is about 50 percent.

Figure 4:
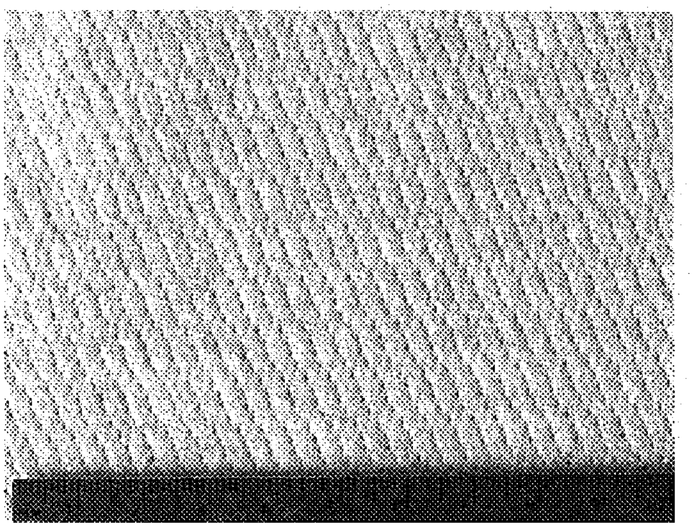
FIG. 4 is a photograph of an unembossed airlaid paper towel sheet illustrating the fabric imprinting pattern similar to the pattern of FIG. 1.

FIG. 4 is a photograph of an airlaid paper towel sheet in which a distinct, regular, overall texture pattern of dots, corresponding to the knuckle pattern of a fabric used during manufacture, is imprinted into the sheet. The geometry of this pattern is the substantially the same as the pattern discussed above relative to FIG. 1. In the photograph, the dots represent depressions in the surface of the sheet.

Figure 5:
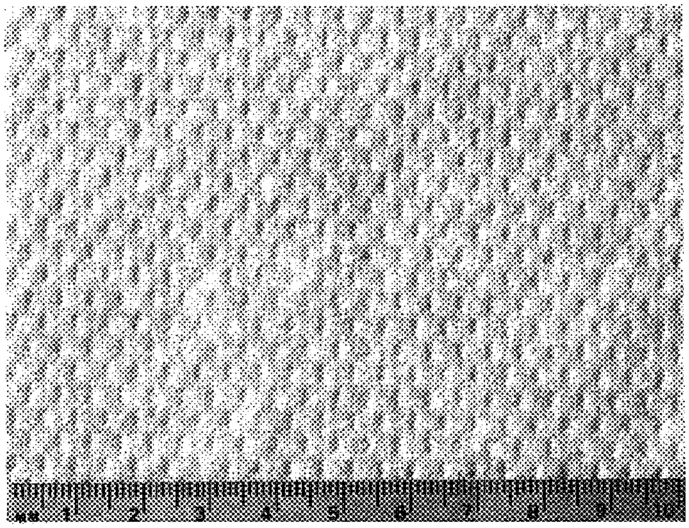
FIG. 5 is a photograph of a smooth paper towel sheet embossed with an embossing pattern similar to the pattern of FIG. 2.

FIG. 5 is a photograph of a smooth tissue sheet which has been embossed with an embossing pattern as illustrated in FIG. 2 to produce a regular, distinct overall texture pattern. As shown in the photograph, the dots in the pattern represent depressions in the surface of the sheet.

Figure 6:
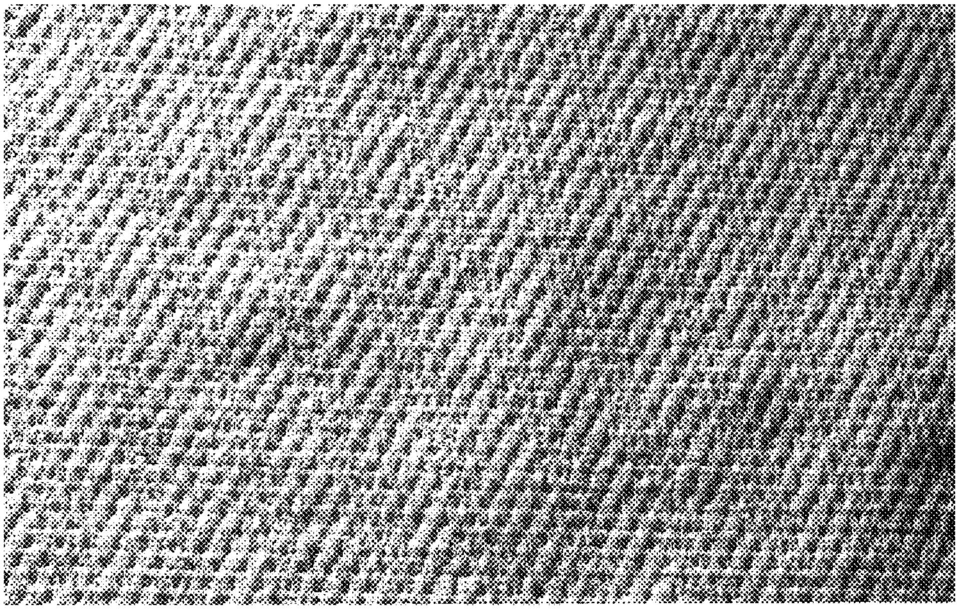
FIG. 6 is a photograph of a product of this invention, in which the airlaid paper towel sheet of FIG. 4 was embossed with the same embossing pattern illustrated in FIG. 5, illustrating the optical interference pattern.

FIG. 6 is a photograph of an airlaid paper towel sheet that contains the fabric imprinting dot pattern of FIG. 4 and which has been embossed with the embossing pattern of FIG. 5. The resulting optical interference stripes 5 are indicated. They are less distinct than those illustrated in FIG. 3 because of the optical "noise" or clutter associated with the fibers and texture of an actual sheet. Nevertheless, the optical interference stripe pattern is discernable.

Figure 7:
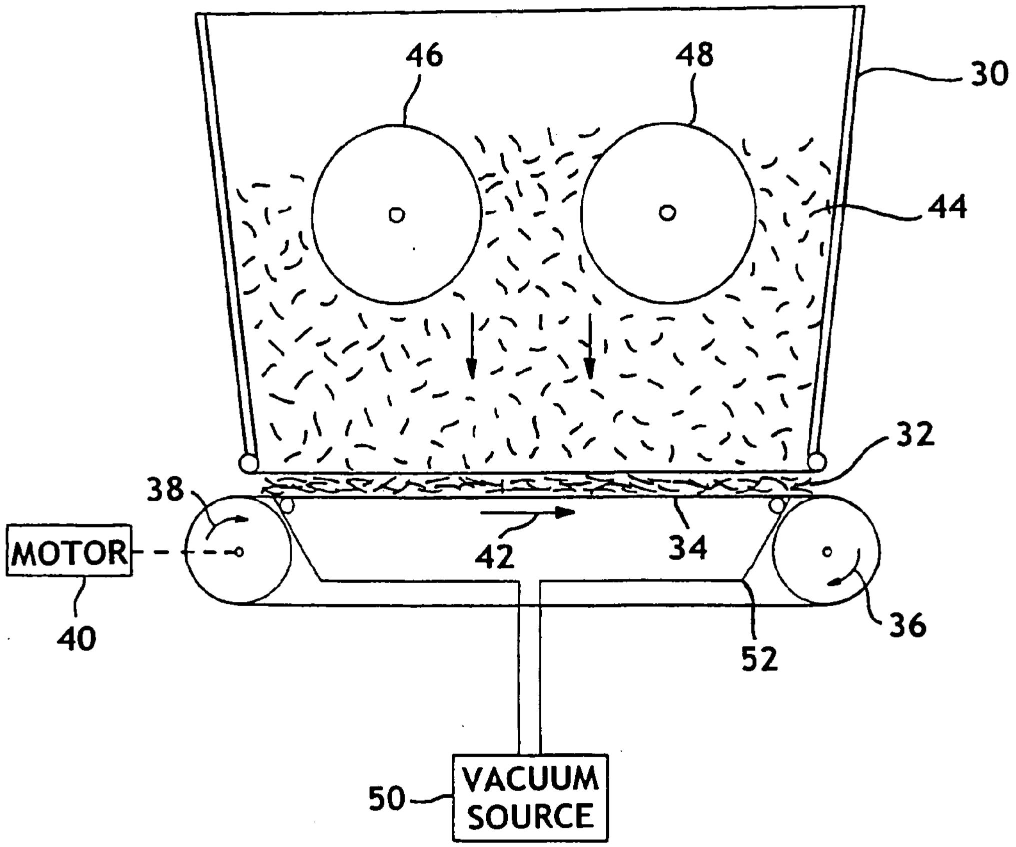
FIG. 7 is a schematic illustration of an airlaying forming apparatus suitable for making paper towels in accordance with this invention.

FIG. 7 schematically illustrates an airlaying forming station useful for airlaying a web of fibers for making an airlaid sheet in accordance with the Example below. As previously mentioned, there are different ways of imparting texture patterns to the tissue sheet for purposes of this invention. Fabric texture patterns associated with airlaying is one such method. Shown in FIG. 7 is an airlaying forming station 30 which produces an airlaid web 32 on a forming fabric or screen 34. The forming fabric 34 can be in the form of an endless belt mounted on support rollers 36 and 38. A suitable driving device, such as an electric motor 40 rotates at least one of the support rollers 38 in a direction indicated by the arrows at a selected speed. As a result, the forming fabric 34 moves in a machine direction indicated by the arrow 42.

The forming fabric 34 can be provided in other forms as desired. For example, the forming fabric can be in the form of a circular drum which can be rotated using a motor as disclosed in U.S. Pat. No. 4,666,647, U.S. Pat. No. 4,761,258, or U.S. Pat. No. 6,202,259, which are incorporated herein by reference. The forming fabric 34 can be made of various materials, such as plastic or metal.

As shown, the airlaying forming station 30 includes a forming chamber 44 having end walls and side walls. Within the forming chamber 44 are a pair of material distributors 46 and 48 which distribute fibers and/or other particles inside the forming chamber 44 across the width of the chamber. The material distributors 46 and 48 can be, for instance, rotating cylindrical distributing screens.

In the embodiment shown in FIG. 7, a single forming chamber 44 is illustrated in association with the forming fabric 34. It should be understood, however, that more than one forming chamber can be included in the system. By including multiple forming chambers, layered webs can be formed in which each layer is made from the same or different materials.

Airlaying forming stations as shown in FIG. 7 are available commercially through Dan-Webforming Int. LTD. of Aarhus, Denmark. Other suitable airlaying forming systems are also available from M & J Fibretech of Horsens, Denmark. As described above, however, any suitable airlaying forming system can be used in accordance with the present invention.

As shown in FIG. 7, below the airlaying forming station 30 is a vacuum source 50, such as a conventional blower, for creating a selected pressure differential through the forming chamber 44 to draw the fibrous material against the forming fabric 34. If desired, a blower can also be incorporated into the forming chamber 44 for assisting in blowing the fibers down on to the forming fabric 34.

In one embodiment, the vacuum source 50 is a blower connected to a vacuum box 52 which is located below the forming chamber 44 and the forming fabric 34. The vacuum source 50 creates an airflow indicated by the arrows positioned within the forming chamber 44. Various seals can be used to increase the positive air pressure between the chamber and the forming fabric surface.

During operation, typically a fiber stock is fed to one or more defibrators (not shown) and fed to the material distributors 46 and 48. The material distributors distribute the fibers evenly throughout the forming chamber 44 as shown. Positive airflow created by the vacuum source 50 and possibly an additional blower force the fibers onto the forming fabric 34 thereby forming an airlaid non-woven web 32.

The material that is deposited onto the forming fabric 34 will depend upon the particular application. The fiber material that can be used to form the airlaid web 32, for instance, can include natural fibers alone or in combination with synthetic fibers. Examples of natural fibers include wood pulp fibers, cotton fibers, wool fibers, silk fibers and the like, as well as combinations thereof. Synthetic fibers can include rayon fibers, polyolefin fibers, polyester fibers and the like, as well as combinations thereof. Polyolefin fibers include polypropylene fibers and polyethylene fibers. Synthetic fibers can be present, for instance, in an amount up to about 50% by weight, such as up to about 30% by weight of the furnish. The fibers can have various lengths, such as up to about 6 to about 8 millimeters or greater.

When wood pulp fibers are present in the airlaid web of the present invention, the pulp fibers may be in a rolled and fluffed form. As is known to those skilled in the art, fluffed fibers generally refer to fibers that have been shredded.

The pulp fibers used to form airlaid webs in accordance with the present invention may be pretreated with a debonding agent prior to incorporation into the airlaid web. Suitable debonding agents that may be used in the present invention include cationic debonding agents such as fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665 to Kaun which is incorporated herein by reference. In particular, Kaun discloses the use of cationic silicone compositions as debonding agents.

In one embodiment, the debonding agent can be an organic quaternary ammonium chloride and particularly a silicone based amine salt of a quaternary ammonium chloride. For example, the debonding agent can be PROSOFT TQ1003 marketed by the Hercules Corporation. The debonding agent can be added to a fiber slurry in an amount of from about 1 kg per metric tonne to about 6 kg per metric tonne of fibers present within the slurry.

When forming the airlaid web 32 from different materials and fibers, the forming chamber 44 can include multiple inlets for feeding the materials to the chamber. Once in the chamber, the materials can be mixed together if desired. Alternatively, the different materials can be separated into different layers in forming the web.

Figure 8:
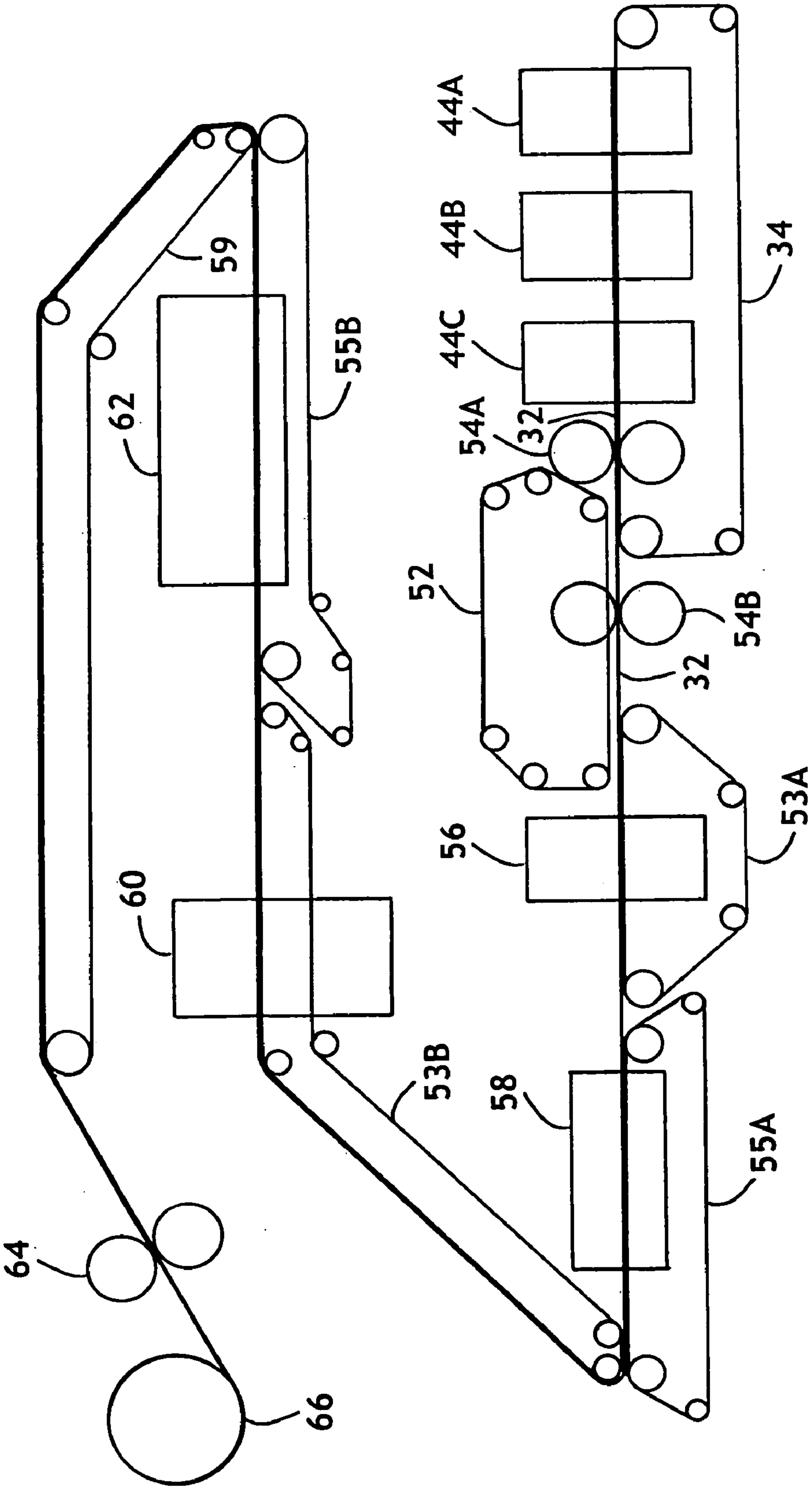
FIG. 8 is a schematic representation of an airlaying process suitable for making paper towels in accordance with this invention.

Referring to FIG. 8, a schematic diagram of an entire web forming system useful for making tissues or towels in accordance with the present invention is shown. In this embodiment, the system includes three separate airlaying forming chambers 44A and 44B and 44C. As described above, the use of multiple forming chambers can serve to facilitate formation of the airlaid web at a desired basis weight. Further, using multiple forming chambers can allow the formation of layered webs. As shown, forming stations 44A, 44B and 44C contribute to the formation of the airlaid web 32.

Airlaid web 32, after exiting the forming chambers 44A, 44B and 44C, is conveyed on a forming fabric 34 to a compaction device 54A. Compaction device 54A can be, for instance, a pair of opposing rolls that define a nip through which the airlaid web and forming fabric are passed. For example, in one embodiment, the compaction device can comprise a steel roll positioned above a rubber-coated roll. The compaction device moderately compacts the airlaid web to generate sufficient strength for transfer of the airlaid web to a transfer fabric such as, for instance, via an open gap arrangement. In general, the compaction device increases the density of the web over the entire surface area of the web as opposed to only creating localized high density areas.

After exiting the compaction device 54A, the airlaid web 32 is transferred to a transfer fabric 52. A suitable transfer fabric is ElectroTech 56 manufactured by Albany International. Once placed upon the transfer fabric, the airlaid web can be fed through a second compaction device 54B and further compacted against the transfer fabric to generate a texture pattern in the sheet. As previously described, the knuckle pattern of the transfer fabric can impart a texture pattern to the web or sheet that can create an interference pattern when the sheet is subsequently embossed. The compaction device 54B can also be used to improve the appearance of the web, to adjust the caliper of the web, and/or to increase the tensile strength of the web.

Next, the airlaid web 32 is transferred to a spray fabric 53A and fed to a spray chamber 56. Within the spray chamber 56, a bonding material is applied to one side of the airlaid web 32. The bonding material can be deposited on the top side of the web using, for instance, spray nozzles. Under fabric vacuum may also be used to regulate and control penetration of the bonding material into the web. The bonding material can be applied to the web in order to add dry strength, wet strength, stretchability, and tear resistance.

In general, any suitable bonding material can be applied to the airlaid web 32. Particular bonding materials that may be used in the present invention include latex compositions, such as acrylates, vinyl acetates, vinyl chlorides and methacrylates. Some water-soluble bonding materials may also be used including polyacrylamides, polyvinyl alcohols and cellulose derivatives such as carboxymethyl cellulose. In one embodiment, the bonding materials used in the process of the present invention comprise an ethylene vinyl acetate copolymer. In particular, the ethylene vinyl acetate copolymer can be cross-linked with N-methyl acrylamide groups using an acid catalyst. Suitable acid catalysts include ammonium chloride, citric acid and maleic acid.

Particular examples of bonding materials that may be used in the present invention include AIRFLEX EN1165 available from Air Products Inc. or ELITE PE BINDER available from National Starch. It is believed that both of the above bonding materials are ethylene vinyl acetate copolymers.

The bonding material can be applied so as to uniformly cover the entire surface area of one side of the web. For instance, the bonding material can be applied to the first side of the web so as to cover at least about 80% of the surface area of one side of the web, such as at least about 90% of the surface area of one side of the web. In other embodiments, the bonding material can cover greater than about 95% of the surface area of one side of the web.

Once the bonding material is applied to one side of the web, as shown in FIG. 8, the airlaid web 32 is transferred to drying fabric 55A and fed to a drying apparatus 58. In the drying apparatus 58, the web is subjected to heat causing the bonding material to dry and/or cure. When using an ethylene vinyl acetate copolymer bonding material, the drying apparatus can be heated to a temperature of from about 120° C. to about 170° C.

From the drying apparatus 58, the airlaid web is then transferred to a second spray fabric 53B and fed to a second spray chamber 60. In the spray chamber 60, a second bonding material is applied to the untreated side of the airlaid web. In general, the first bonding material and the second bonding material can be different bonding materials or the same bonding material. The second bonding material may be applied to the nonwoven web as described above with respect to the first bonding material.

From the second spray chamber 60, the nonwoven web is then transferred to a second drying fabric 55B and passed through a second drying apparatus 62 for drying and/or curing the second bonding material.

From the second drying apparatus 62, the airlaid web 32 is transferred to a return fabric 59 and may optionally be fed to a further compaction device 64 prior to being wound on a reel 66. The compaction device 64 can be similar to the first compaction device and may comprise, for instance, calender rolls. Alternatively, the compaction device 64 can be a pair of embossing rolls used for the purpose of softening and further texturizing the sheet and camouflaging the two texture patterns as described above.

In order to emboss or further emboss the web 32 in accordance with this invention, the web can subsequently be fed to an embossing station. The embossing rolls can be any rolls suitable for embossing such as are well known in the art. Particularly suitable embossing rolls can be steel/rubber or steel/steel. Embossing nip pressures can be, without limitation, from about 100 to about 400 pounds per lineal inch. After embossing, the web can be conventionally converted into the final product, which can be a paper towel, an industrial wiper, bath tissue, facial tissue, table napkin and the like.

Figure 9:
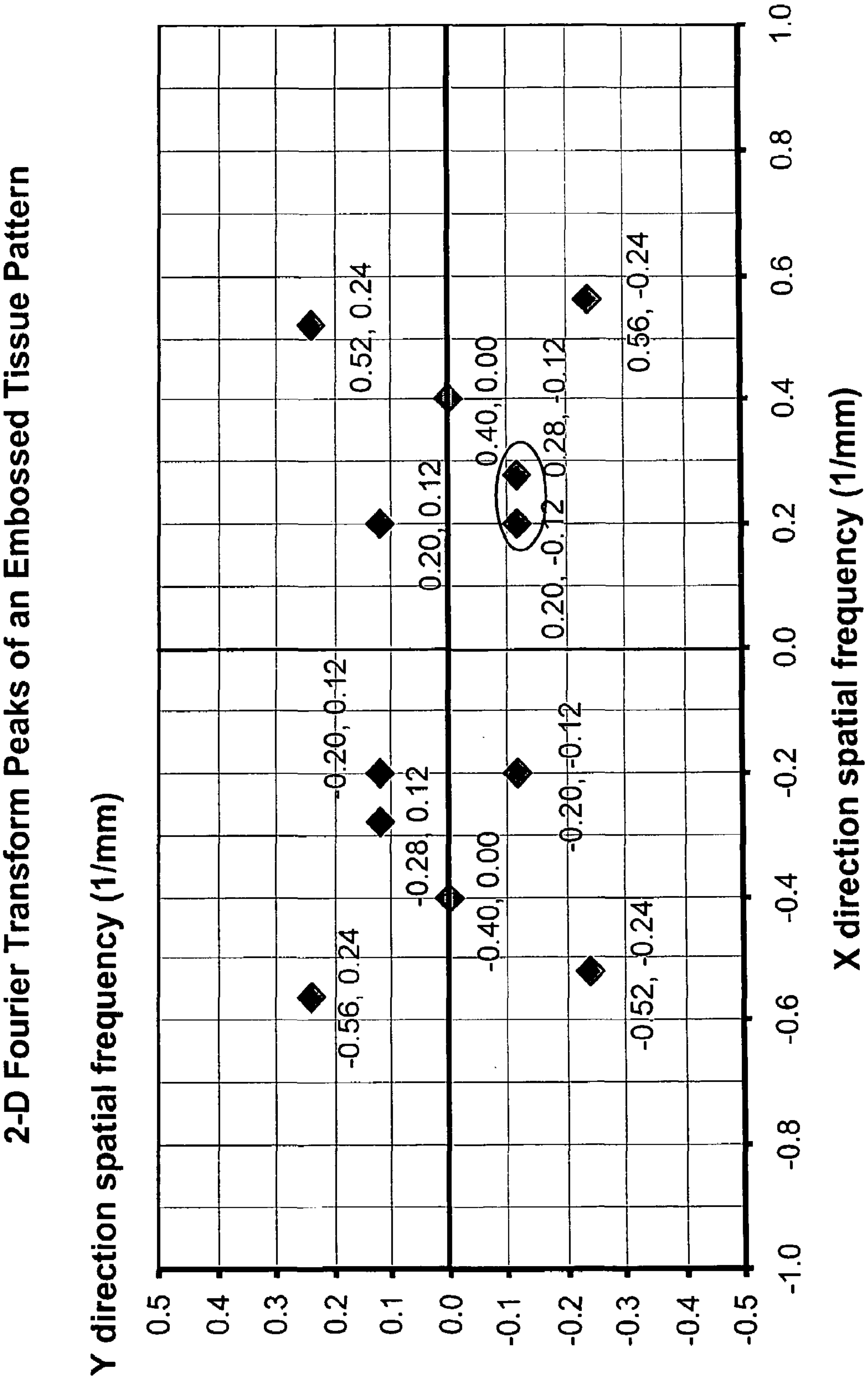
FIG. 9 is 2-dimensional representation of the Fourier transform peaks of an embossed tissue pattern in accordance with this invention.

FIG. 9 shows spatial frequencies of 12 primary Fourier magnitudes for the pattern shown in FIG. 3. The symbols on the graph are the locations of the 12 largest Fourier magnitudes in the spatial frequency domain that are at least 30 percent of the largest Fourier magnitude. The x and y axes correspond to the spatial frequencies in the x and y direction, respectively, and are in units of inverse millimeters ($mm^{-1}$). Each of the 12 symbols has the x-direction and y-direction frequency displayed next to it for clarity. The smallest polar spatial frequency of the 12 primary Fourier magnitudes are associated with the four symbols closest to the (0, 0) axis point at the center of the graph. There are four points, labeled (0.20, 0.12), (0.20, −0.12), (−0.20, 0.12), (−0.20, −0.12) that all have the same value of the polar spatial frequency, equal to 0.23 $mm^{-1}$. The spatial frequencies correspond to the inverse of the spacing of one of the underlying patterns or a harmonic of them. The circle around the point (0.20, −0.12) and the adjacent point (0.28, −0.12) is an example of how the two different base patterns that formed the pattern in FIG. 3 result in frequency differences smaller than the lowest primary polar frequency. The difference between these two frequencies is 0.08 $mm^{-1}$, compared to 0.23 for the smallest polar spatial frequency as shown above. The smaller frequency corresponds to a larger period of repetition, in this case about 1.2 cm, which is larger than either of the base patterns. This will result in an optical interference pattern in the tissue sheet of about this same scale.

Figure 10:
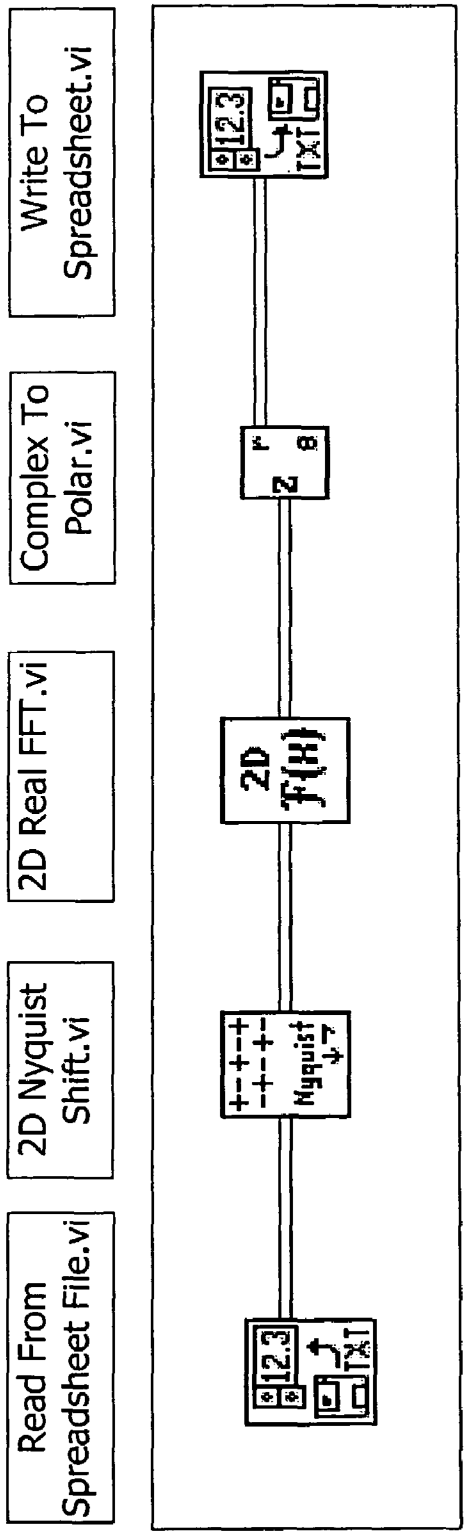
FIG. 10 is a program listing of the National Instruments LabVIEW software used to calculate the Fourier magnitudes and their associated spatial frequencies in accordance with this invention.

FIG. 10 is a program listing of the National Instruments LabVIEW software used to calculate the Fourier magnitudes and their associated spatial frequencies in accordance with this invention. The first module reads the data in from a spreadsheet file, which the user must set-up from the surface topography scan. Only the height data is read, as the x and y data are assumed to be in numerical order of unscaled numbers 0–255. The second module Nyquist shifts the data so that the resulting Fourier transform is centered on zero frequency. The third module is the 2D Fourier transform, and the fourth module converts the complex Fourier coefficients to a polar coordinate representation of real numbers. The final module writes the array to a spreadsheet file, although it could also be plotted, listed, or transferred to any other media.

EXAMPLE

An airlaid paper towel basesheet was made in accordance with the method described in FIG. 8. More specifically, Biobright TR kraft pulp fiber from UPM-Kymmene was fed to the three forming chambers. The fibers were deposited onto the forming fabric traveling at a speed of about 800 feet per minute. The weight percent ratio of fibers being deposited from the first, second and third forming chambers was 40/30/30. The basis weight was 55 grams per square meter. The newly-formed web was transferred to a transfer fabric (Albany Electrotech 56) and, while supported by the transfer fabric, compacted in steel/rubber compaction nip. This compaction step imparted a knuckle pattern to the web as illustrated in FIG. 1. The latex binder (National Starch Elite PE) was thereafter sprayed onto both sides of the compacted web at a total add-on level of about 12 percent and cured to above 95 percent at a temperature of about 170° C. The cured web was wound onto the reel without further compaction.

The resulting basesheet is shown in FIG. 4. The topographical pattern imparted to the basesheet by the transfer fabric knuckle pattern was a regular pattern of depressions (dots) as digitally represented by FIG. 1, each dot being about 1 millimeter in diameter. The dots are arranged in a series of parallel rows substantially parallel to the cross-machine direction as described in connection with FIG. 1. The spacing between dots within each row, center-to-center, is about 3.7 millimeters. The spacing between rows, center-to-center, is about 2 millimeters. Each row is offset from the adjacent row by 25 percent of the spacing between the dots, resulting in an angular tilt to the pattern of about 25 degrees.

Thereafter, the airlaid basesheet was embossed in accordance with this invention. More particularly, the basesheet was passed through a rubber/steel embossing nip at ambient temperature with a nip pressure of about 300 pounds per lineal inch. The rubber backing roll had a hardness of 65 Shore A. The surface of the engraved steel roll had a regular pattern of protrusions as shown in FIG. 2. The protrusions had a length of 3 millimeters and a width of 1.5 millimeters. The protrusions were arranged in parallel rows diagonal to the machine direction of the basesheet. The spacing between the rows, center-to-center, was 4.0 millimeters and the spacing between elements, center-to-center, was 5.1 millimeters. Each row is offset from the previous row by 50 percent of the spacing between the dots, resulting in an angular tilt to the pattern of about 32 degrees. The resulting basesheet is shown in FIG. 6. A digital representation is shown in FIG. 3.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of from about 1 to about 5 shall be considered to support claims to any of the following sub-ranges: 1–4; 1–3; 1–2; 2–5; 2–4; 2–3; 3–5; 3–4; and 4–5.

It will be appreciated that the foregoing description and example, given for purposes of illustration, are not to be construed as limiting the scope of the invention, which is defined by the following claims and all equivalents thereto.

We claim:

1. A tissue sheet having a surface texture characterized by 24 or fewer primary polar spatial frequencies greater than 0.2 $mm^{-1}$ where the primary polar spatial frequencies have Fourier magnitudes greater than 5 times the average Fourier magnitude for the tissue surface and are limited in number to those with Fourier magnitudes of 20 percent or more of the special frequency with the largest Fourier magnitude, such that no two of the primary Fourier magnitudes have absolute frequency differences less than 0.1 $mm^{-1}$.

2. The tissue sheet of claim 1 wherein the number of primary polar spatial frequencies is 12 or fewer.

3. The tissue sheet of claim 1 wherein the primary polar spatial frequencies are limited in number to those with magnitudes of 30 percent or more of the spatial frequency with the largest magnitude.

4. The tissue sheet of claim 1 wherein the primary polar spatial frequencies are limited in number to those with magnitudes of 40 percent or more of the spatial frequency with the largest magnitude.

5. The tissue sheet of claim 1, 2, 3 or 4 wherein the primary polar spatial frequencies all have Fourier magnitudes 10 or more times the average Fourier magnitude for the tissue surface.

6. The tissue sheet of claim 1, 2, 3 or 4 wherein the primary polar spatial frequencies all have Fourier magnitudes 20 or more times the average Fourier magnitude for the tissue surface.

7. The tissue sheet of claim 1 wherein no two of the primary Fourier magnitudes have absolute frequency differences of 0.075 $mm^{-1}$ or less.

8. The tissue sheet of claim 1 wherein no two of the primary Fourier magnitudes have absolute frequency differences of 0.05 $mm^{-1}$ or less.

9. The tissue sheet of claim 1 wherein the sheet is an airlaid sheet.

* * * * *